United States Patent
Harmon et al.

(10) Patent No.: US 12,530,282 B2
(45) Date of Patent: Jan. 20, 2026

(54) VALIDATION OF APPLICATION PROGRAMMING INTERFACES

(71) Applicant: Plaid Inc., San Francisco, CA (US)

(72) Inventors: Alec Harmon, Brooklyn, NY (US);
Kashish Arora, New York, NY (US);
Justin Cohen, Philadelphia, PA (US);
Ariel Bong, New York, NY (US); Erik Umenhofer, Benicia, CA (US);
Xiaojiang Wei, Markham (CA);
William Rowan, Ann Arbor, MI (US);
Chandni Chopra Sorrentino, Brooklyn, NY (US)

(73) Assignee: Plaid Inc., San Francisco, CA (US)

( * ) Notice: Subject to any disclaimer, the term of this patent is extended or adjusted under 35 U.S.C. 154(b) by 132 days.

(21) Appl. No.: 18/448,753

(22) Filed: Aug. 11, 2023

(65) Prior Publication Data

US 2025/0053504 A1 Feb. 13, 2025

(51) Int. Cl.
*G06F 11/3668* (2025.01)
*G06F 8/10* (2018.01)

(52) U.S. Cl.
CPC ............ *G06F 11/3688* (2013.01); *G06F 8/10* (2013.01)

(58) Field of Classification Search
CPC ................................. G06F 1/3688; G06F 8/10
USPC .............................. 717/120–150; 706/25–45
See application file for complete search history.

(56) References Cited

U.S. PATENT DOCUMENTS

| | | | |
|---|---|---|---|
| 6,243,862 B1 * | 6/2001 | Lebow | G06F 9/466 714/E11.208 |
| 7,900,201 B1 * | 3/2011 | Qureshi | G06N 5/048 717/124 |
| 7,945,902 B1 * | 5/2011 | Sahoo | G06F 9/44589 714/48 |
| 8,170,975 B1 * | 5/2012 | Qureshi | G06N 5/048 706/45 |
| 9,552,237 B2 | 1/2017 | Biesack | |
| 10,133,650 B1 | 11/2018 | Park et al. | |
| 10,740,215 B2 | 8/2020 | Lowe et al. | |
| 11,042,427 B2 | 6/2021 | Bahrami et al. | |
| 11,379,348 B2 | 7/2022 | Sathianarayanan et al. | |
| 11,640,352 B2 * | 5/2023 | Moondhra | G06F 11/3684 717/124 |

(Continued)

OTHER PUBLICATIONS

Harrison et al, Verification of User Interface Software: The Example of Use-Related Safety Requirements and Programmable Medical Devices, IEEE, pp. 1-13 (Year: 2017).*

(Continued)

*Primary Examiner* — Anil Khatri
(74) *Attorney, Agent, or Firm* — Harrity & Harrity, LLP

(57) ABSTRACT

In some implementations, a validation device may receive a set of rules associated with requests to and responses from a set of application programming interfaces (APIs). The validation device may transmit, to the set of APIs, a plurality of requests based on the set of rules. The validation device may receive, from the set of APIs, a plurality of responses corresponding to the plurality of requests. The validation device may verify the plurality of responses against the set of rules. The validation device may transmit, to a user device, instructions for a user interface indicating one or more results from verifying the plurality of responses against the set of rules.

20 Claims, 13 Drawing Sheets

(56) References Cited

U.S. PATENT DOCUMENTS

| | | | | |
|---|---|---|---|---|
| 11,714,913 B2* | 8/2023 | Shaik | ............... | G06F 21/604 |
| | | | | 706/25 |
| 11,722,598 B2* | 8/2023 | Willshire | ............... | H04M 3/24 |
| | | | | 717/124 |
| 11,740,215 B2* | 8/2023 | Hur | ............... | G01N 33/0009 |
| | | | | 73/23.2 |
| 11,748,247 B2* | 9/2023 | Chikkala | ............... | G06F 11/3692 |
| | | | | 717/124 |
| 11,755,462 B2* | 9/2023 | Rubin | ............... | G06F 11/3672 |
| | | | | 717/131 |
| 12,299,162 B1* | 5/2025 | Butler | ............... | H04L 9/3213 |

OTHER PUBLICATIONS

Ferdowsi et al, "Validating AI-Generated Code with Live Programming", ACM, pp. 1-8 (Year: 2024).*
Adrion et al, "Validation, Verification, and Testing of Computer Software", ACM, pp. 1-34 (Year: 1982).*
Danielsen et al, "Validation and Interactivity of Web API Documentation", IEEE, pp. 1-8 (Year: 2013).*
Kim et al, "Enhancing REST API Testing with NLP Techniques", ACM, pp. 1-12 (Year: 2023).*
Elizabeth Kopple, "What is FDX and why does it matter," Plaid Inc. (2023), 12 pages.

* cited by examiner

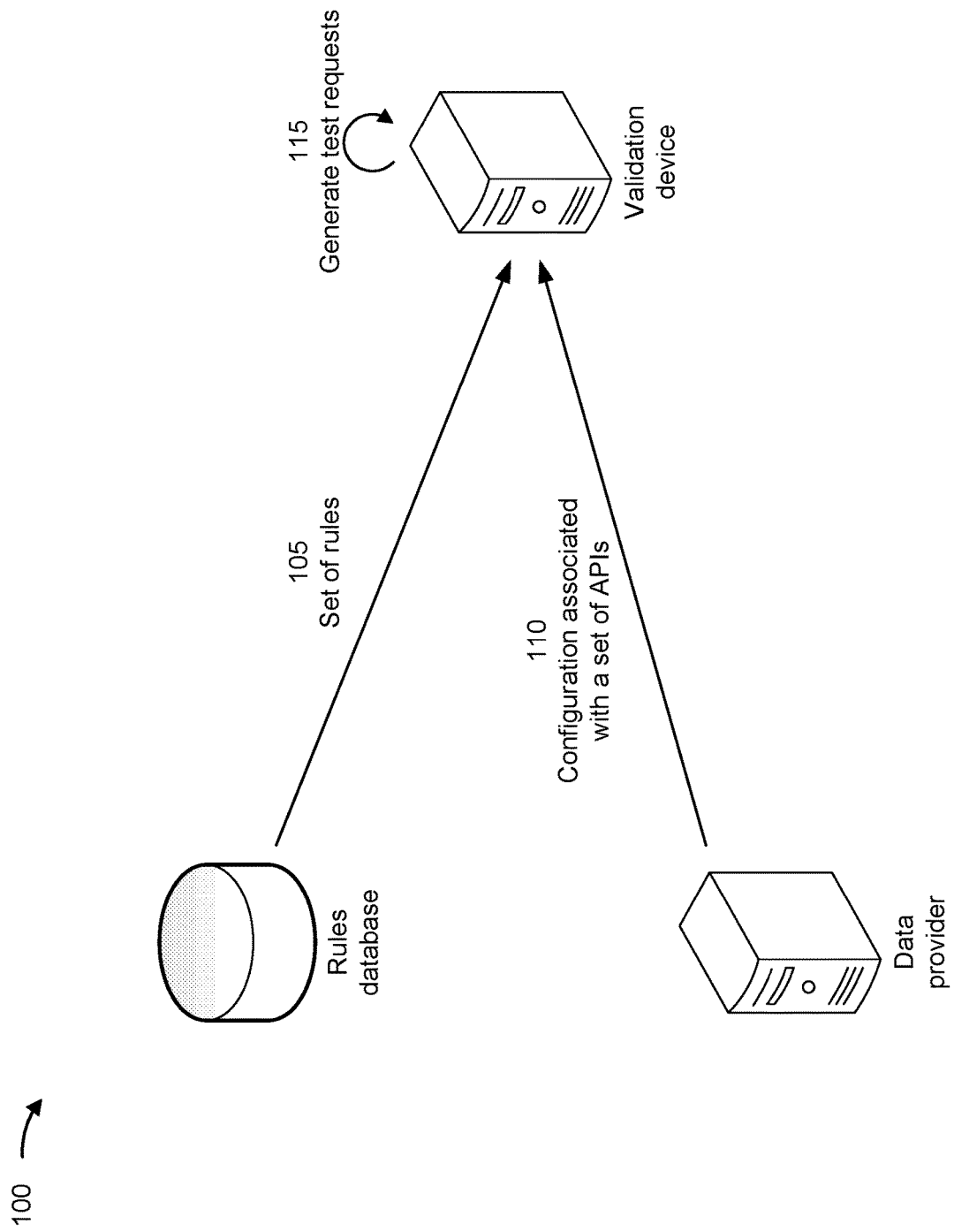

Core Exchange

*Validator*

| | Connect account | Validate again ~225 |
|---|---|---|
| | 230 | |

| Description | Endpoint | Response |
|---|---|---|
| AUTHENTICATION | /customers/current | 220 — PASS > |
| CONTACT INFO | /accounts/{accountId}/contact | 215a — PASS > |
| LIST ACCOUNTS | /accounts | 215b — PASS > |
| BALANCES | /accounts/{accountId} | PASS > |
| TRANSACTIONS | /accounts/{accountId}/transactions | FAIL > |
| PAYMENT NETWORKS | /accounts/{accountId}/payments-networks | PASS > |
| GENERAL VALIDATION | | PASS > |

< Transactions
Response

Checking account   Savings account   College savings

| | |
|---|---|
| Item ID | zqVXM5nLkRi8KzjaJVESw1k4E8MB4i0k7A56 |
| Account ID | yDaREyzyvrS9nijAvV0OiqLqe6zmEzUDP4XY9 |
| Latency | 26ms |
| Response code | 200 |
| Validation | 0 Failures |

235

Data shared with apps
Start date       End date
[XX-XX-XXXX]   [XX-XX-XXXX]

Transactions   Investments

| | | | |
|---|---|---|---|
| | | Request again | View JSON |
| Name | Amount | | Date |
| Business 1 | $56.32 | | XXXX-XX-XX |
| Restaurant 1 | $8.99 | | XXXX-XX-XX |
| Restaurant 2 | $6.22 | | XXXX-XX-XX |
| Stream service 1 | $12.02 | | XXXX-XX-XX |

| ‹ Transactions Response | | | |
|---|---|---|---|
| Checking account | Savings account | College savings | |
| Item ID | zqVXM5nLkRi8KzjaJVESw1k4E8MB4i0k7A56 | | |
| Account ID | yDaREyzyvrS9njjAvV0OiqLqe6zmEzUDP4XY9 | | |
| Latency | 26ms | | |
| Response code | 200 | | |
| Validation | 3 Failures | | |
| Failure 1 | Account ID: loc_01_creditcardAccount. Account not found | | |
| Failure 2 | Account ID: loc_01_creditcardAccount. Account not found | | |
| Failure 3 | Account ID: loc_01_creditcardAccount. Account not found | | |

FIG. 2D

VALIDATION OF APPLICATION PROGRAMMING INTERFACES

BACKGROUND

Application programming interfaces (APIs) are used to pass information between applications, whether executed by a same device or by different devices (e.g., connected via a network). Generally, an API will receive a request from a device and transmit a response, to the request, to the device.

SUMMARY

Some implementations described herein relate to a system for validating a set of APIs. The system may include one or more memories and one or more processors communicatively coupled to the one or more memories. The one or more processors may be configured to receive a subset of rules, associated with requests to and responses from the set of APIs, from a set of rules included in a specification or standards document. The one or more processors may be configured to transmit, to the set of APIs, a plurality of test requests generated based on the subset of rules. The one or more processors may be configured to receive, from the set of APIs, a plurality of test responses corresponding to the plurality of test requests. The one or more processors may be configured to verify the plurality of test responses against the subset of rules. The one or more processors may be configured to output instructions for a user interface (UI) indicating one or more results from verifying the plurality of test responses against the subset of rules. The one or more processors may be configured to receive an indication that one or more production requests were transmitted to the set of APIs. The one or more processors may be configured to receive one or more production responses that were received from the set of APIs. The one or more processors may be configured to verify the one or more production responses against the subset of rules. The one or more processors may be configured to output instructions to update the UI based on one or more results from verifying the one or more production responses against the subset of rules.

Some implementations described herein relate to a method of validating a set of APIs. The method may include receiving a set of rules associated with requests to and responses from the set of APIs. The method may include transmitting, to the set of APIs, a plurality of requests based on the set of rules. The method may include receiving, from the set of APIs, a plurality of responses corresponding to the plurality of requests. The method may include verifying, at a validation device, the plurality of responses against the set of rules. The method may include transmitting, to a user device, instructions for a UI indicating one or more results from verifying the plurality of responses against the set of rules.

Some implementations described herein relate to a non-transitory computer-readable medium that stores a set of instructions for validating a set of APIs. The set of instructions, when executed by one or more processors of a device, may cause the device to receive a subset of rules, associated with requests to and responses from the set of APIs, from a set of rules included in a specification or standards document. The set of instructions, when executed by one or more processors of the device, may cause the device to transmit, to the set of APIs, a plurality of test requests generated based on the subset of rules. The set of instructions, when executed by one or more processors of the device, may cause the device to receive, from the set of APIs, a plurality of test responses corresponding to the plurality of test requests. The set of instructions, when executed by one or more processors of the device, may cause the device to verify the plurality of test responses against the subset of rules. The set of instructions, when executed by one or more processors of the device, may cause the device to receive an indication that one or more production requests were transmitted to the set of APIs. The set of instructions, when executed by one or more processors of the device, may cause the device to receive one or more production responses that were received from the set of APIs. The set of instructions, when executed by one or more processors of the device, may cause the device to verify the one or more production responses against the subset of rules. The set of instructions, when executed by one or more processors of the device, may cause the device to output an indication of results from verifying the one or more production responses against the subset of rules and verifying the plurality of test responses against the set of rules.

BRIEF DESCRIPTION OF THE DRAWINGS

FIGS. 1A-1E are diagrams of an example implementation relating to validation of a set of APIs.

FIGS. 2A-2E are diagrams of a series of example user interfaces relating to validating a set of APIs.

DETAILED DESCRIPTION

Figure 1B:
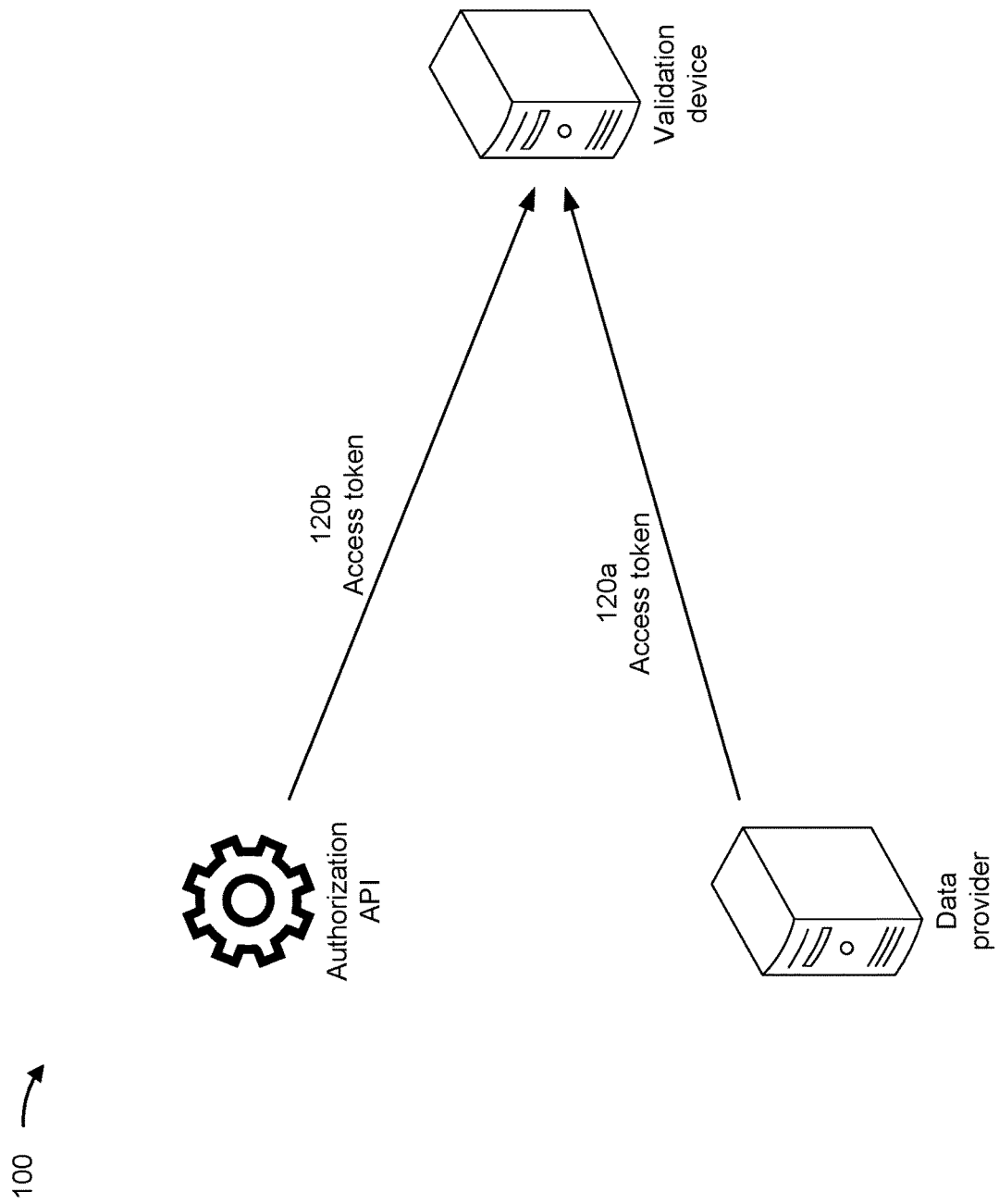

The following detailed description of example implementations refers to the accompanying drawings. The same reference numbers in different drawings may identify the same or similar elements.

Application programming interfaces (APIs) may be built according to a specification (or standards document). As a result, the APIs should be validated against the specification. For example, requests to the APIs should comply with the specification, and responses from the APIs should be consistent with the specification. Testing the APIs may be performed against the specification; however, the specification may be long and complex, which increases power and processing resources that are used in testing. Additionally, in some situations, the specification may be vague (e.g., allowing for different data types to be included in a request or a response), which may result in the APIs failing to integrate with certain devices or systems even when the APIs are compliant with the specification.

Some implementations described herein enable validation of a set of APIs against a subset of rules out of a set of rules included in a specification or standards document (rather than against the entire specification). Using the subset of rules conserves power and processing resources as compared with using the entire specification. Additionally, in some implementations, the set of APIs may be validated against one or more implementation rules (e.g., that clarify an ambiguity or vaguery in the specification). Using one or more implementation rules validates whether the set of APIs will properly integrate with certain devices or systems. As a result, downtime caused by failure of the set of APIs to integrate with certain devices or systems is reduced, which conserves power and processing resources that would otherwise be expended in troubleshooting.

Testing APIs is often performed using test data. Accordingly, example requests are generated and transmitted to the APIs, and the APIs provide example responses to the example requests. However, the test data fail to detect problems with the APIs that happen during production use of the APIs. Additionally, if the APIs are associated with an authorization system, the authorization system is of necessity tested concurrently with the APIs because a credential from the authorization system is required to gain access to the APIs. However, the authorization system is also developed independently from the APIs (and may even be developed by a different entity than the entity developing the APIs). As a result, testing of the APIs may be delayed if the authorization system is not ready.

Some implementations described herein enable validation of a set of APIs using both test and production data. As a result, failures in the set of APIs are detected faster during production use, which reduces downtime and in turn conserves power and processing resources expended on troubleshooting. Additionally, in some implementations, the set of APIs may be validated using a custom access token, which allows for the set of APIs to be tested without testing a related authorization API. As a result, testing of the APIs may be performed sooner and with less network overhead.

Results from testing APIs may be included in JavaScript® Object Notation (JSON) files or another type of data received from the APIs. However, reviewing JSON files is time-consuming and thus wastes power and processing resources. Additionally, when the APIs are providing data that will be transformed and delivered to an addition device, results from testing do not indicate how the data will look after transformation. As a result, problems with the transformation may go undetected.

Some implementations described herein enable generation of a user interface (UI) that indicates results from verifying a set of APIs. The UI allows for faster review of the results, which in turn conserves power and processing resources as compared with reviewing JSON files (or another type of raw data). Additionally, in some implementations, data examples may be generated based on responses from the set of APIs. As a result, failures in transformations that are applied to the responses are detected earlier, which reduces downtime and in turn conserves power and processing resources expended on troubleshooting.

FIGS. 1A-1E are diagrams of an example 100 associated with validation of a set of APIs. As shown in FIGS. 1A-1E, example 100 includes a validation device, a data provider, a rules database, an authorization API, a set of APIs, and an aggregator. These devices are described in more detail in connection with FIGS. 3 and 4.

As shown in FIG. 1A and by reference number 105, the rules database may transmit, and the validation device may receive, a set of rules associated with requests to, and responses from, the set of APIs. The set of rules may be a subset of rules out of a larger set of rules included in a specification or standards document (e.g., financial data exchange (FDX) standards). Additionally, in some implementations, the set of rules may include implementation choices (e.g., one or more implementation choices) based on the specification or standards document. For example, the implementation choices may include rules that clarify ambiguities or vagueries in the specification or standards document. Accordingly, the set of rules may be configured to ensure cooperability between the set of APIs and a device that has implemented the specification or standards document (e.g., the aggregator described herein).

In some implementations, the validation device may transmit, and the rules database may receive, a request for the set of rules. Accordingly, the rules database may transmit, and the validation device may receive, the set of rules in response to the request. The validation device may transmit the request periodically (e.g., according to a schedule) and/or in response to input from a user of the validation device. Instead of the validation device pulling the set of rules from the rules database, the rules database may push the set of rules to the validation device. For example, the rules database may transmit the set of rules periodically (e.g., according to a schedule) and/or based on a modification to the set of rules. The validation device may subscribe to updates from the rules database such that the rules database transmits the set of rules whenever a modification to the set of rules is detected by the rules database.

As shown by reference number 110, the data provider may transmit, and the validation device may receive, a configuration associated with the set of APIs. For example, the configuration may indicate a set of endpoints (e.g., Internet protocol (IP) addresses) corresponding to the set of APIs. Additionally, the configuration may indicate a mapping between the set of APIs and APIs that are defined in the specification or standards document. In some implementations, the data provider may provide a set of credentials (e.g., a username and password, a certificate, a private key, and/or biometric information, among other examples), and the validation device may validate the set of credentials before accepting the configuration from the data provider. Accordingly, a user associated with the data provider may log into the validation device before the validation system transmits the configuration.

In some implementations, the data provider may transmit the configuration periodically (e.g., according to a schedule) and/or in response to input from a user associated with the data provider. The user may interact (e.g., using an input component of the data provider) with a UI, output (e.g., using an output component of the data provider) based on instructions from the validation device, such that the interaction triggers the data provider to transmit the configuration. The validation device may transmit the instructions for the UI in response to validating the set of credentials from the data provider, as described above.

As shown by reference number 115, the validation device may generate a plurality of test requests based on the set of rules. For example, the validation device may generate a plurality of commands (e.g., command line prompts) that call the set of APIs, where any commands that include parameters include parameters consistent with the set of rules. The plurality of test requests may be stored (e.g., locally in a memory controlled by the validation device and/or at least partially separate from the validation device, whether logically, virtually, and/or physically) for later use (e.g., as described in connection with FIG. 1C).

As shown in FIG. 1B and by reference number 120a, the data provider may transmit, and the validation device may receive, an access token. The access token may be included in requests to the set of APIs in order to authenticate the requests (that is, the set of APIs reject any requests that lack a valid access token). The access token may identify the validation device and be derived from a secret associated with the validation device. The secret may have been generated by the data provider, and the data provider may derive the access token from the secret. For example, the secret may include a signature based on a private key associated with (e.g., via a key distribution center (KDC)) the validation device. A user associated with the data provider may interact (e.g., using an input component of the data provider) with a UI (e.g., as described in connection with FIG. 2A), such that the interaction triggers the data provider to transmit the access token. Alternatively, the data provider may transmit the access token automatically (e.g., with the configuration or in a subsequent message after transmitting the configuration).

In some implementations, an administrator device associated with the set of APIs may transmit the access token rather than the data provider. A user of the administrator device may be an administrator associated with the data provider. The user of the administrator device may similarly interact (e.g., using an input component of the administrator device) with a UI (e.g., as described in connection with FIG. 2A), such that the interaction triggers the administrator device to transmit the access token.

The validation device may use the access token to transmit the plurality of test requests, as described in connection with FIG. 1C. As a result, the set of APIs may be validated using the access token, which allows for the set of APIs to be tested without testing the authorization API. Validation of the set of APIs may thus be performed sooner and with less network overhead.

Alternatively, as shown by reference number 120b, the authorization API (e.g., at least one authorization API) may transmit, and the validation device may receive, the access token. For example, the validation device may transmit, and the authorization API may receive, a request for the access token. The request may include a call to the authorization API that includes a parameter identifying the validation device (e.g., a name, an IP address, a medium access control (MAC) address, and/or another type of alphanumeric identifier associated with the validation device). Accordingly, the authorization API may transmit, and the validation device may receive, the access token in response to the request.

In some implementations, a user associated with the data provider may interact (e.g., using an input component of the data provider) with a UI (e.g., as described in connection with FIG. 2A), such that the interaction triggers the data provider to transmit an instruction to the validation device to request the access token. Accordingly, the validation device may communicate with the authorization API in response to the instruction. Alternatively, the validation device may communicate with the authorization API automatically (e.g., in response to receiving the configuration).

The validation device may use the access token to transmit the plurality of test requests, as described in connection with FIG. 1C. As a result, the set of APIs may be validated in combination with the authorization API, which uses power and processing resources more efficiently than testing the set of APIs separately from the authorization API.

Although the example 100 includes the validation device generating the plurality of test requests before receiving the access token, other examples may include the validation device generating the plurality of test requests after receiving the access token.

Figure 1C:
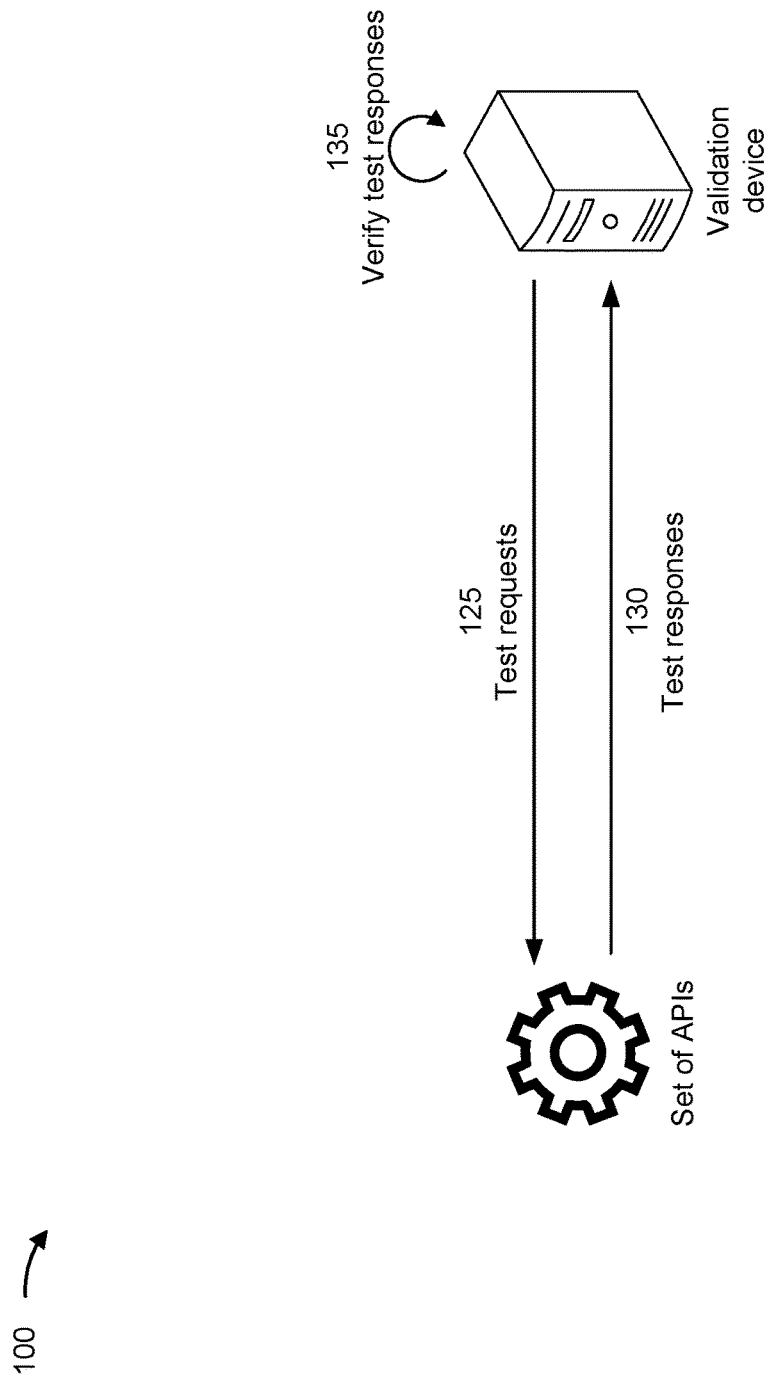

As shown in FIG. 1C and by reference number 125, the validation device may transmit, and the set of APIs may receive, the plurality of test requests generated based on the set of rules. For example, the validation device may perform calls to the set of APIs using parameters, based on the set of rules, included in the plurality of test requests. The calls may include requests transmitted to a set of endpoints associated with the set of APIs.

As shown by reference number 130, the set of APIs may transmit, and the validation device may receive, a plurality of test responses corresponding to the plurality of test requests. For example, the set of APIs may return the plurality of test responses based on calls to the set of APIs from the validation device. The validation device may store the plurality of test responses (e.g., locally in a memory controlled by the validation device and/or at least partially separate from the validation device, whether logically, virtually, and/or physically) for verification (e.g., as described below).

As shown by reference number 135, the validation device may verify the plurality of test responses against the set of rules. Verification may be structure-based. Accordingly, the validation device may verify that fields (e.g., at least one field) indicated in the set of rules are present in expected responses (e.g., at least one) of the plurality of test responses. For example, the set of rules may define a name field expected to be present in a response from an accounts API, and thus the validation device may confirm whether a name field is present in the test response corresponding to the accounts API. Additionally, or alternatively, verification may be element-based. Accordingly, the validation device may verify that values (e.g., at least one value), in expected responses (e.g., at least one) of the plurality of test responses, are in a format indicated in the set of rules. For example, the set of rules may define that an amount field in a response from a transactions API should be encoded as a float data type (and/or a double data type), and thus the validation device may confirm whether a value in the amount field in the test response corresponding to the transactions API is encoded as a float (and/or a double) data type.

In some implementations, the validation device additionally verifies that the access token is accepted by the set of APIs. For example, the validation device may confirm that none of the plurality of test responses include error messages that indicate a rejection of the access token. As a result, the validation device may validate the set of APIs in combination with the authorization API.

Figure 1D:
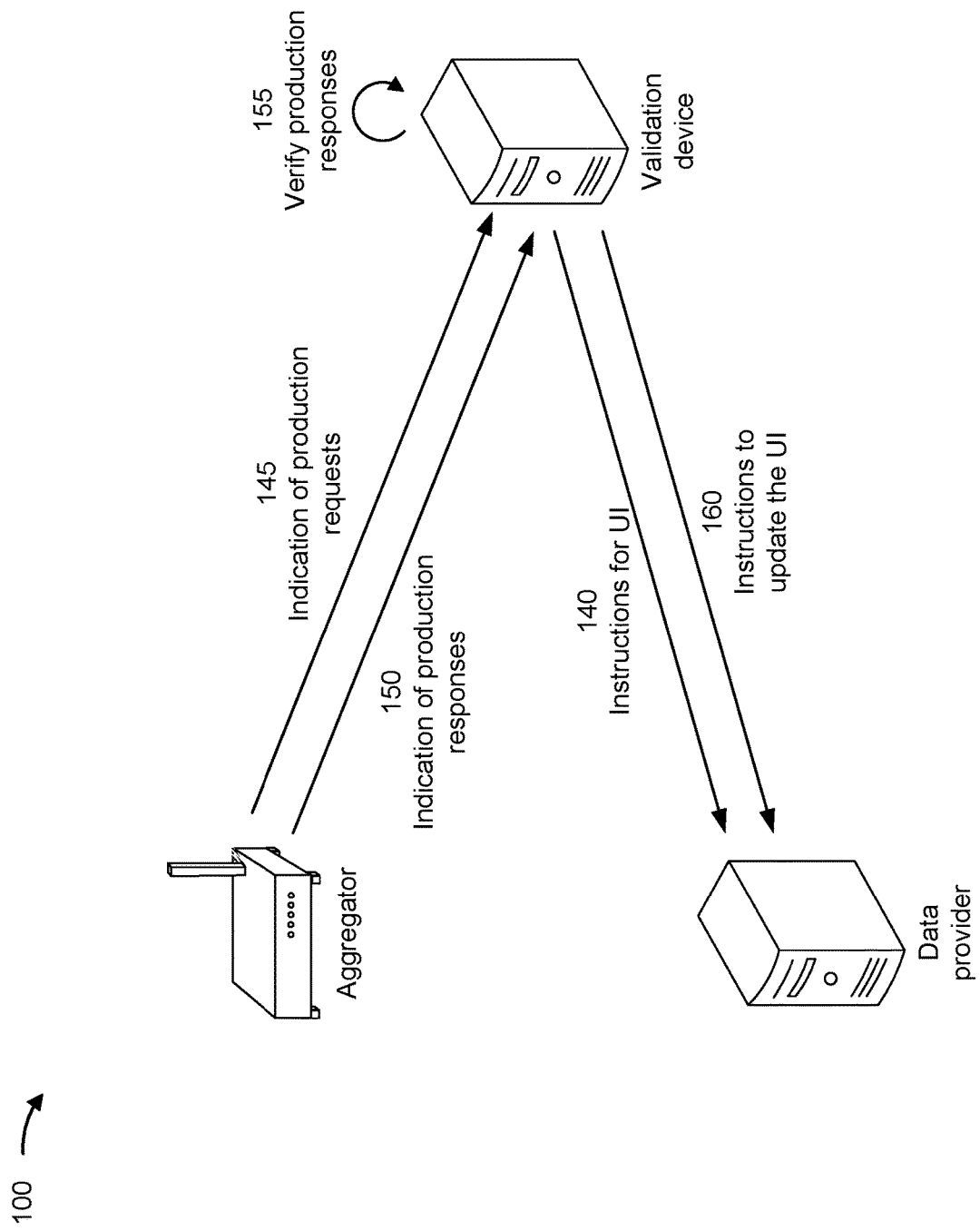

The validation device may output an indication of results (e.g., one or more results) from verifying the plurality of test responses against the set of rules. For example, as shown in FIG. 1D and by reference number 140, the validation device may output instructions for a UI indicating the results from verifying the plurality of test responses against the set of rules. As described in connection with FIG. 2B, the UI may include a visual indicator, associated with an API in the set of APIs, of whether the API passed or failed. In some implementations, and as further described in connection with FIG. 2B, the UI may further indicate a result from verifying that the access token is accepted. The UI allows for faster review of the results, which in turn conserves power and processing resources as compared with reviewing JSON files (or another type of raw data).

The example 100 is shown with the indication of the results as output to the data provider. For example, the UI may be output using an output component of the data provider. In some implementations, a user device associated with the set of APIs may receive the indication of the results rather than the data provider. A user of the user device may be associated with the data provider. An output component of the user device may similarly output the UI.

In some implementations, the data provider may transmit, and the validation device may receive, an indication of an interaction with a visual indicator (e.g., as described above) associated with an API in the set of APIs. Accordingly, the validation device may output instructions for an additional UI (e.g., as described in connection with FIG. 2C or FIG. 2D) including information about the API associated with the visual indicator. As described in connection with FIG. 2D, the API in the set of APIs may be associated with a plurality of failures, and the additional UI may include a plurality of indicators corresponding to the plurality of failures. As described in connection with FIG. 2E, the additional UI may include a representation of a raw test response (e.g., a JSON file received from the API).

The example 100 is shown with the indication of the interaction as transmitted by the data provider. For example, a user of the data provider may interact with the UI (e.g., using an input component of the data provider), which triggers the data provider to transmit the indication of the interaction. In some implementations, a user device associated with the set of APIs may transmit the indication of the interaction rather than the data provider. For example, a user of the user device may similarly interact with the UI (e.g., using an input component of the user device), which triggers the user device to transmit the indication of the interaction. Therefore, the instructions for the additional UI may similarly be transmitted to the user device in place of the data provider.

As shown by reference number 145, the aggregator may transmit, and the validation device may receive, an indication that production requests (e.g., one or more production requests) were transmitted to the set of APIs. For example, the aggregator may transmit the production requests in order to obtain account information and provide the account information to a customer device (e.g., an administrator device, a user device, a different data provider, or another type of third-party server or device). In some implementations, the aggregator may provide a copy of the production requests. Alternatively, the aggregator may transmit the production requests to the validation device for forwarding to the set of APIs, such that the validation device may generate a copy of the production requests before transmitting the production requests to the set of APIs.

As shown by reference number 150, the aggregator may transmit, and the validation device may receive, an indication that production responses (e.g., one or more production responses) were received from the set of APIs. For example, the aggregator may receive the production responses that include the account information to be provided to the customer device. In some implementations, the aggregator may provide a copy of the production responses. For example, the validation device may transmit a request for the production responses and receive the copy of the production responses in response to the request. Alternatively, the validation device may transmit the copy of the production responses automatically after transmitting a copy of the production requests. Alternatively, the validation device may receive the production responses from the set of APIs for forwarding to the aggregator, such that the validation device may generate a copy of the production responses before transmitting the production responses to the aggregator.

As shown by reference number 155, the validation device may verify the production responses against the set of rules. Verification may be performed similarly as described above for the plurality of test responses. Validating the set of APIs using both test and production data allows for detecting failures in the set of APIs faster during production use, which reduces downtime and in turn conserves power and processing resources expended on troubleshooting.

Although the example 100 includes the validation device receiving production requests and responses from the aggregator, other examples may include the validation device transmitting the production requests to the set of APIs and receiving the production responses from the set of APIs. For example, the validation device may be at least partially integrated (e.g., physically, logically, and/or virtually) with the aggregator such that the validation device communicates with the set of APIs for production requests as well as test requests.

The validation device may output an indication of results (e.g., one or more results) from verifying the production responses against the set of rules. For example, as shown by reference number 160, the validation device may output instructions to update the UI based on the results from verifying the production responses against the set of rules. Although the example 100 is shown with the results from production data being subsequently added to the UI, other examples may include the validation device generating the UI in a single process to include both the results from the production data and the results from test data described above. The UIs described herein may be output by the data provider using a web browser or another type of application executed by the data provider.

Figure 1E:
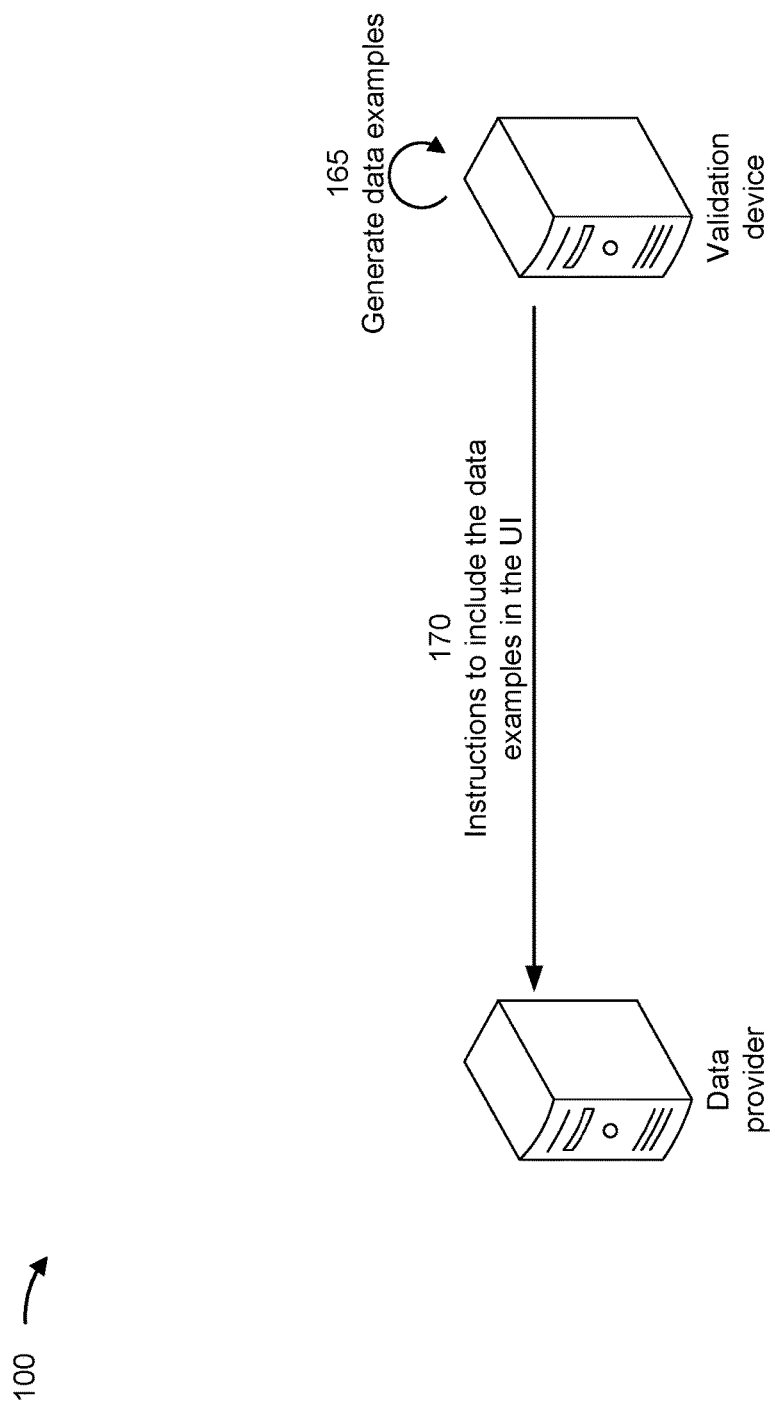

In some implementations, and as shown in FIG. 1E and by reference number 165, the validation device may generate data examples (e.g., one or more data examples) by applying transformations (e.g., one or more transformations) to the plurality of test responses and/or to the production responses. For example, the validation device may transform raw responses (e.g., in JSON files) to tabular data (as shown in FIG. 2C) or another type of structure. The validation device may perform the transformations based on how the aggregator modifies responses before providing information from the responses to a customer device, as described above. As a result, failures in the transformations are detected earlier, which reduces downtime and in turn conserves power and processing resources expended on troubleshooting.

The validation device may output the data examples. For example, as shown in by reference number 170, the validation device may output instructions to include the data examples in the UI. Although the example 100 is shown with the data examples being subsequently added to the UI, other examples may include the validation device generating the UI in a single process to include both the results from validating the set of APIs and the data examples.

The operations in the example 100 are repeatable. For example, the validation device may perform validations on ongoing production traffic (e.g., between the aggregator and the set of APIs). Therefore, the validation device may detect problems while the set of APIs are in use, and not only during testing.

The operations in the example 100 are scalable. For example, the data provider may transmit, and the validation device may receive, an indication when a new API is added. Additionally, or alternatively, the set of APIs may be associated with a first account (or a first type of account, such as a checking account), and the data provider may transmit, and the validation device may receive, an indication when a second account (or a second type of account, such as an investment account) is added. In response to the indication, the validation device may generate new test requests and verify new test responses from the new API (and/or from the set of APIs but associated with the second account) against the set of rules. The validation device may further output instructions to update the UI based on results (e.g., one or more results from verifying the new test responses against the set of rules). The validation device may additionally monitor production traffic between the aggregator and the new API and/or associated with the second account, as described above.

By using techniques as described in connection with FIGS. 1A-1E, the validation device verifies the set of APIs against the set of rules rather than against the entire specification or standards document, which conserves power and processing resources. Additionally, the set of rules may include implementation rules (e.g., that clarify an ambiguity or vaguery in the specification) that ensure the set of APIs will properly integrate with certain devices or systems (e.g., the aggregator). As a result, downtime caused by failure of the set of APIs to integrate with the aggregator is reduced, which conserves power and processing resources that would otherwise be expended in troubleshooting.

Additionally, the validation device verifies the set of APIs using both test and production data. As a result, failures in the set of APIs are detected faster during production use, which reduces downtime and in turn conserves power and processing resources expended on troubleshooting. Furthermore, the validation device generates instructions for the UI that indicates the results. The UI allows for faster review of the results, which in turn conserves power and processing resources as compared with reviewing raw responses from the set of APIs. Additionally, the UI may include the data examples, which allows for earlier detection of failures in transformations that are applied to responses from the set of APIs (e.g., by the aggregator), which reduces downtime and in turn conserves power and processing resources expended on troubleshooting.

As indicated above, FIGS. 1A-1E are provided as an example. Other examples may differ from what is described with regard to FIGS. 1A-1E.

FIGS. 2A-2E are diagrams of a series 200 of example UIs associated with validating a set of APIs. The example UIs shown in FIGS. 2A-2E may be output by a user device based on instructions from a validation device. These devices are described in more detail in connection with FIGS. 3 and 4.

Figure 2A:
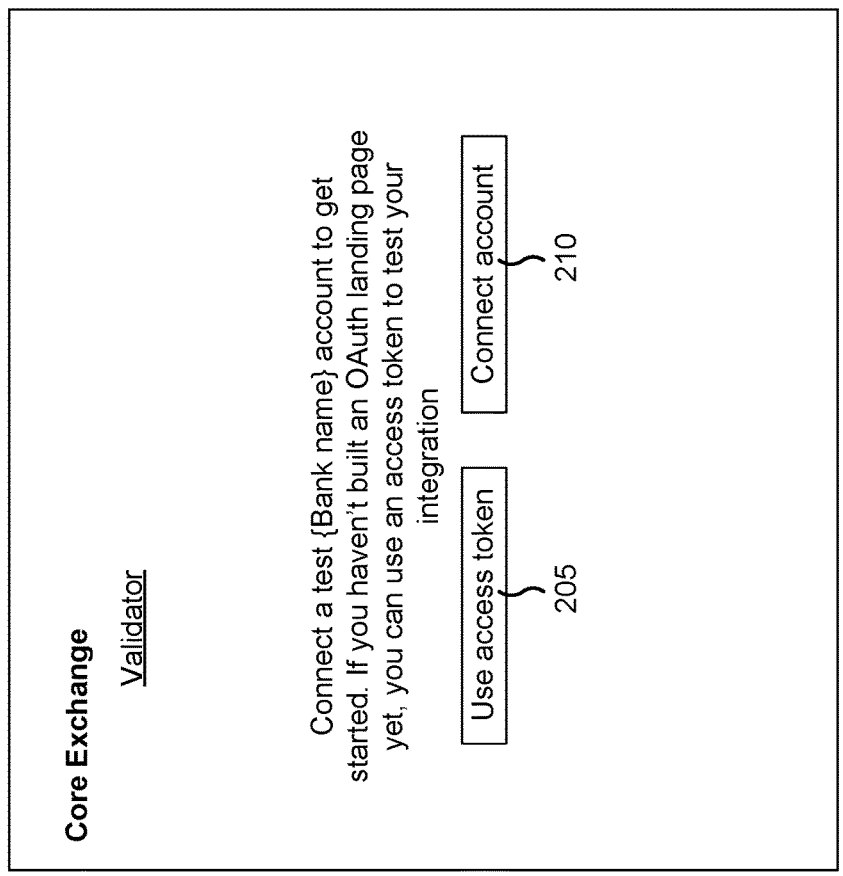

As shown in FIG. 2A, an example UI may depict a first button 205 and a second button 210 (or a pair of another type of interactive elements). The first button 205 may trigger the user device to upload an access token for testing the set of APIs, as described in connection with reference number 120*a* of FIG. 1B. The second button 210 may trigger the validation device to test an authorization API in combination with the set of APIs, as described in connection with reference number 120*b* of FIG. 1B.

The validation device may validate the set of APIs as described in connection with FIGS. 1A-1E and transmit instructions for an example UI, as shown in FIG. 2B. The example UI in FIG. 2B includes a set of visual indicators (e.g., visual indicator 215*a* and visual indicator 215*b*) corresponding to the set of APIs and indicating whether the corresponding APIs passed or failed. FIG. 2B shows the visual indicators as text-based; other examples may additionally or alternatively include color-based visual indicators (e.g., green for pass and red for fail). As further shown in FIG. 2B, the example UI includes a visual indicator 220 associated with a result from verifying an access token from the authorization API. The visual indicator 220 may be omitted from example implementations where the user device provides the access token.

As described in connection with FIGS. 1A-1E, validation of the set of APIs is repeatable. Accordingly, in FIG. 2B, the example UI includes a button 225 that triggers the validation device to generate new test requests to the set of APIs and verify new test responses from the APIs. Additionally, as described in connection with FIGS. 1A-1E, validation of the set of APIs is scalable. Accordingly, in FIG. 2B, the example UI includes a button 230 that allows configuration of a new account for the set of APIs and that triggers the validation device to generate new test requests associated with the new account and verify new test responses based on the new test requests.

In some implementations, the visual indicators shown in FIG. 2B are interactive. For example, the user device may transmit an indication of an interaction to trigger the validation device to provide instructions for an example UI, as shown in FIG. 2C or in FIG. 2D. By interacting with a particular visual indicator in the set of visual indicators, the user device may trigger the validation device to provide an example UI associated with a same API in the set of APIs as is associated with the particular visual indicator.

In FIG. 2C, the example UI includes information 235 associated with a selected API. The information 235 includes an identifier associated with the selected API (shown as "Item ID"), an account associated with the selected API (shown as "Account ID"), a latency in receiving responses from the selected API (shown as "Latency"), a code associated with response from the selected API (shown as "Response code"), and an indication that the selected API passed validation (shown as "Validation" with "0 Failures"), among other examples. FIG. 2D is similar but shows a selected API that failed validation (shown as "Validation" with "3 Failures") and further includes descriptions associated with each failed verification.

As further shown in FIG. 2C, the example UI includes data examples 240 that show how responses from the selected API will be transformed and forwarded to a customer device. In the example UI of FIG. 2C, the data examples include tabular data that includes a "Name" field, an "Amount" field, and a "Date" field. Other structures (e.g., graph data) may be used, and other fields may be used and populated. In FIG. 2C, the example UI includes a button 245 that allows the user device to view raw responses from the set of APIs.

Figure 2E:
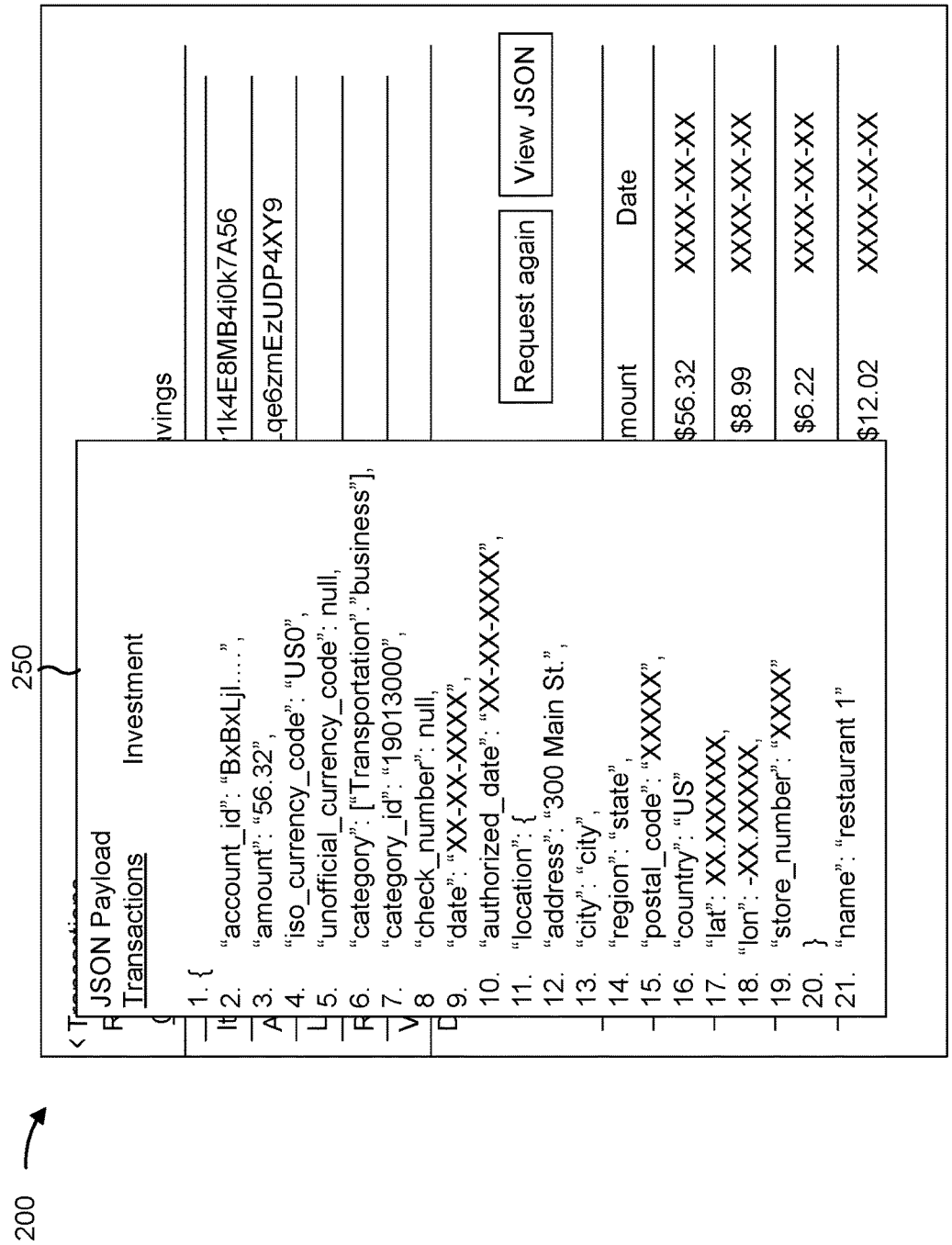

The user device may transmit an indication of an interaction with the button 245 to trigger the validation device to provide instructions for an overlay window, as shown in FIG. 2E. The overlay window 250 in FIG. 2E depicts a raw response (e.g., a JSON file) from the selected API. The raw response may be a most recent response from the selected API and/or may be a response associated with a failed verification for the selected API.

As indicated above, FIGS. 2A-2E are provided as examples. Other examples may differ from what is described with regard to FIGS. 2A-2E.

Figure 3:
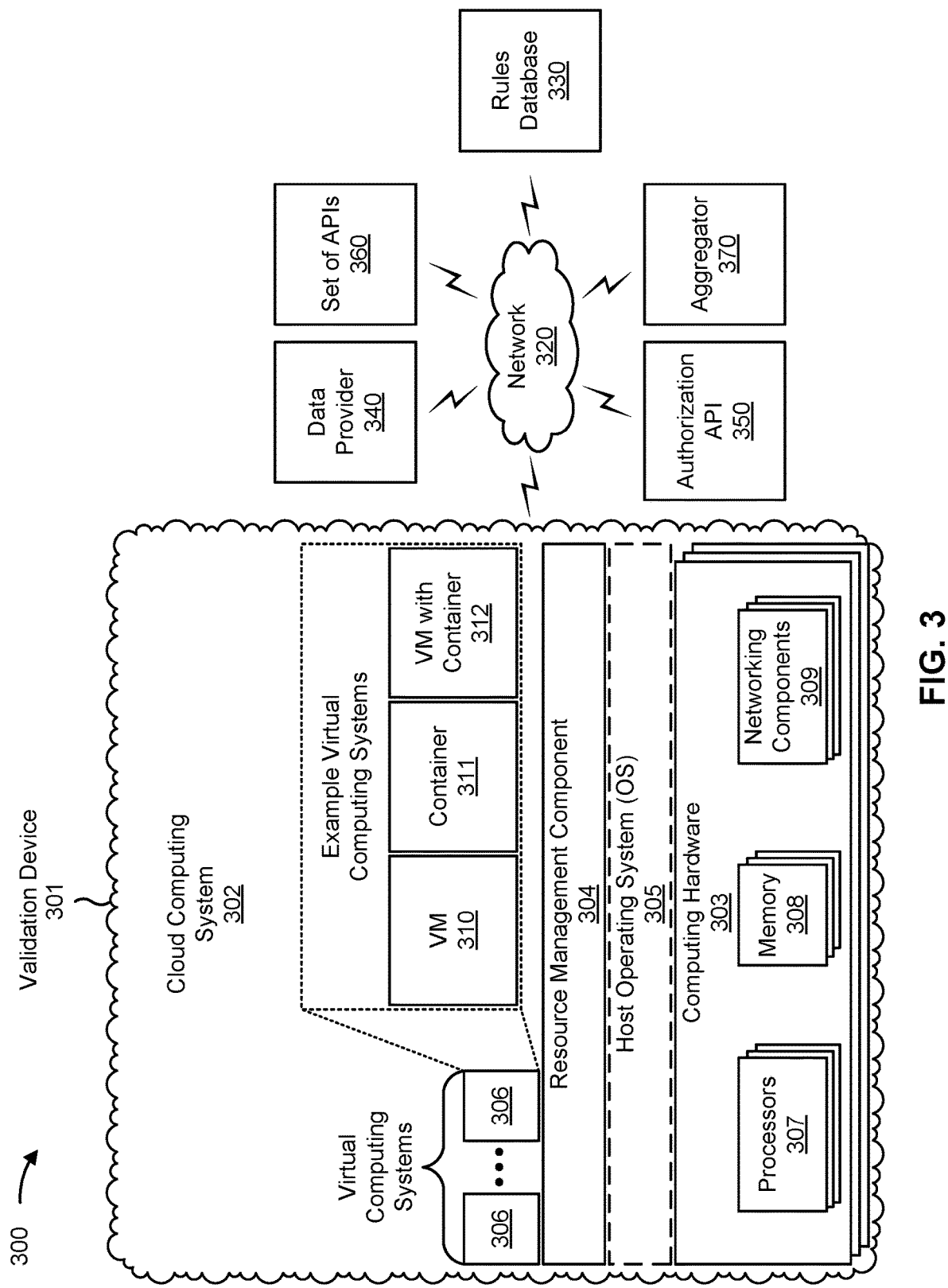
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a validation device 301, which may include one or more elements of and/or may execute within a cloud computing system 302. The cloud computing system 302 may include one or more elements 303-312, as described in more detail below. As further shown in FIG. 3, environment 300 may include a network 320, a rules database 330, a data provider 340, an authorization API 350, a set of APIs 360, and/or an aggregator 370. Devices and/or elements of environment 300 may interconnect via wired connections and/or wireless connections.

The cloud computing system 302 may include computing hardware 303, a resource management component 304, a host operating system (OS) 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

The computing hardware 303 may include hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, and/or one or more networking components 309. Examples of a processor, a memory, and a networking component (e.g., a communication component) are described elsewhere herein.

The resource management component 304 may include a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 310. Additionally, or alternatively, the resource management component 304 may include a container manager, such as when the virtual computing systems 306 are containers 311. In some implementations, the resource management component 304 executes within and/or in coordination with a host operating system 305.

A virtual computing system 306 may include a virtual environment that enables cloud-based execution of operations and/or processes described herein using computing hardware 303. As shown, a virtual computing system 306 may include a virtual machine 310, a container 311, or a hybrid environment 312 that includes a virtual machine and a container, among other examples. A virtual computing system 306 may execute one or more applications using a file system that includes binary files, software libraries, and/or other resources required to execute applications on a guest operating system (e.g., within the virtual computing system 306) or the host operating system 305.

Although the validation device 301 may include one or more elements 303-312 of the cloud computing system 302, may execute within the cloud computing system 302, and/or may be hosted within the cloud computing system 302, in some implementations, the validation device 301 may not be cloud-based (e.g., may be implemented outside of a cloud computing system) or may be partially cloud-based. For example, the validation device 301 may include one or more devices that are not part of the cloud computing system 302, such as device 400 of FIG. 4, which may include a stand-alone server or another type of computing device. The validation device 301 may perform one or more operations and/or processes described in more detail elsewhere herein.

The network 320 may include one or more wired and/or wireless networks. For example, the network 320 may include a cellular network, a public land mobile network (PLMN), a local area network (LAN), a wide area network (WAN), a private network, the Internet, and/or a combination of these or other types of networks. The network 320 enables communication among the devices of the environment 300.

The rules database 330 may be implemented on one or more devices capable of receiving, generating, storing, processing, and/or providing information associated with API rules, as described elsewhere herein. The rules database 330 may be implemented on a communication device and/or a computing device. For example, the rules database 330 may be implemented on a server, a database server, an application server, a client server, a web server, a host server, a proxy server, a virtual server (e.g., executing on computing hardware), a server in a cloud computing system, a device that includes computing hardware used in a cloud computing environment, or a similar type of device. The rules database 330 may communicate with one or more other devices of environment 300, as described elsewhere herein.

The data provider 340 may include one or more devices capable of receiving, generating, storing, processing, and/or providing information associated with accounts, as described elsewhere herein. The data provider 340 may configure the set of APIs 360 and/or the authorization API 350. The data provider 340 may include a communication device and/or a computing device. For example, the data provider 340 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. A user associated with the data provider 340 may interact with the data provider 340 directly or via an administrator device and/or a user device (e.g., a wireless communication device, a mobile phone, a user equipment, a laptop computer, a tablet computer, a desktop computer, a gaming console, a set-top box, a wearable communication device, or a similar type of device). The data provider 340 may communicate with one or more other devices of environment 300, as described elsewhere herein.

The authorization API 350 may be provided by one or more devices capable of receiving, generating, storing, processing, and/or providing information associated with authorization, as described elsewhere herein. The authorization API 350 may be provided by a communication device and/or a computing device. For example, the authorization API 350 may be provided by a server, a database server, an application server, a client server, a web server, a host server, a proxy server, a virtual server (e.g., executing on computing hardware), a server in a cloud computing system, a device that includes computing hardware used in a cloud computing environment, or a similar type of device. The authorization API 350 may be provided by the data provider 340 and/or a device at least partially separate (e.g., logically, virtually, and/or physically) from the data provider 340. The authorization API 350 may communicate with one or more other devices of environment 300, as described elsewhere herein.

The set of APIs 360 may be provided by one or more devices capable of receiving, generating, storing, processing, and/or providing information associated with accounts, as described elsewhere herein. The set of APIs 360 may be provided by a communication device and/or a computing device. For example, the set of APIs 360 may be provided by a server, a database server, an application server, a client server, a web server, a host server, a proxy server, a virtual server (e.g., executing on computing hardware), a server in a cloud computing system, a device that includes computing hardware used in a cloud computing environment, or a similar type of device. The set of APIs 360 may be provided by the data provider 340 and/or a device at least partially separate (e.g., logically, virtually, and/or physically) from the data provider 340. The set of APIs 360 may communicate with one or more other devices of environment 300, as described elsewhere herein.

The aggregator 370 may include one or more devices capable of receiving, generating, storing, processing, and/or providing information associated with accounts, as described elsewhere herein. The aggregator 370 may receive and store account information from data partners (e.g., the data provider 340). The aggregator 370 may include a communication device and/or a computing device. For example, the aggregator 370 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The aggregator 370 may communicate with one or more other devices of environment 300, as described elsewhere herein.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
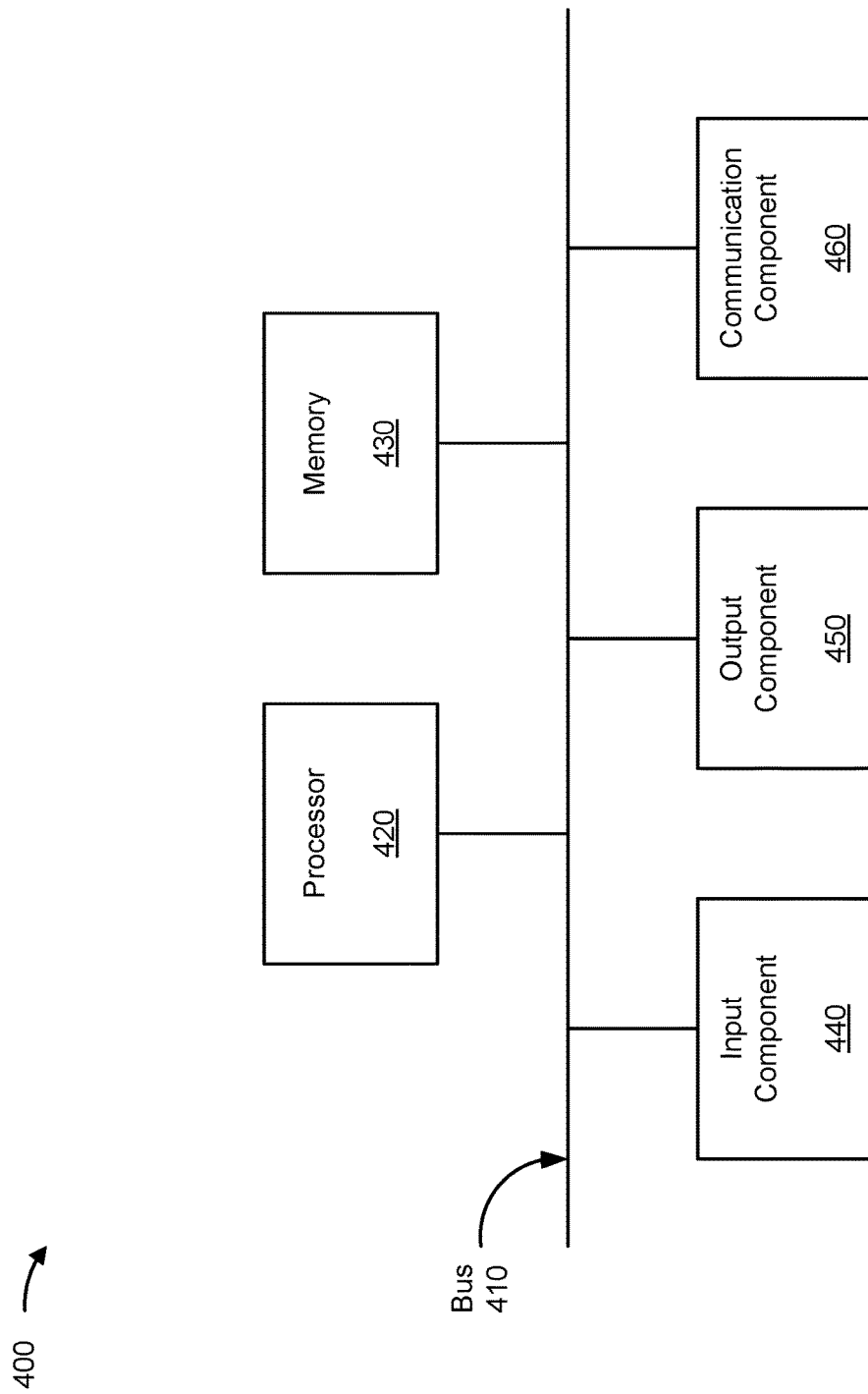
FIG. 4 is a diagram of example components of one or more devices of FIG. 3.

FIG. 4 is a diagram of example components of a device 400 associated with validation of a set of APIs. The device 400 may correspond to a device implementing a rules database 330, a data provider 340, a device providing an authorization API 350, a device providing a set of APIs 360, and/or an aggregator 370. In some implementations, a device implementing the rules database 330, the data provider 340, a device providing the authorization API 350, a device providing the set of APIs 360, and/or the aggregator 370 may include one or more devices 400 and/or one or more components of the device 400. As shown in FIG. 4, the device 400 may include a bus 410, a processor 420, a memory 430, an input component 440, an output component 450, and/or a communication component 460.

The bus 410 may include one or more components that enable wired and/or wireless communication among the components of the device 400. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus. The processor 420 may include a central processing unit, a graphics processing unit, a microprocessor, a controller, a microcontroller, a digital signal processor, a field-programmable gate array, an application-specific integrated circuit, and/or another type of processing component. The processor 420 may be implemented in hardware, firmware, or a combination of hardware and software. In some implementations, the processor 420 may include one or more processors capable of being programmed to perform one or more operations or processes described elsewhere herein.

The memory 430 may include volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 may store information, one or more instructions, and/or software (e.g., one or more software applications) related to the operation of the device 400. In some implementations, the memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430.

The input component 440 may enable the device 400 to receive input, such as user input and/or sensed input. For example, the input component 440 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 450 may enable the device 400 to provide output, such as via a display, a speaker, and/or a light-emitting diode. The communication component 460 may enable the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
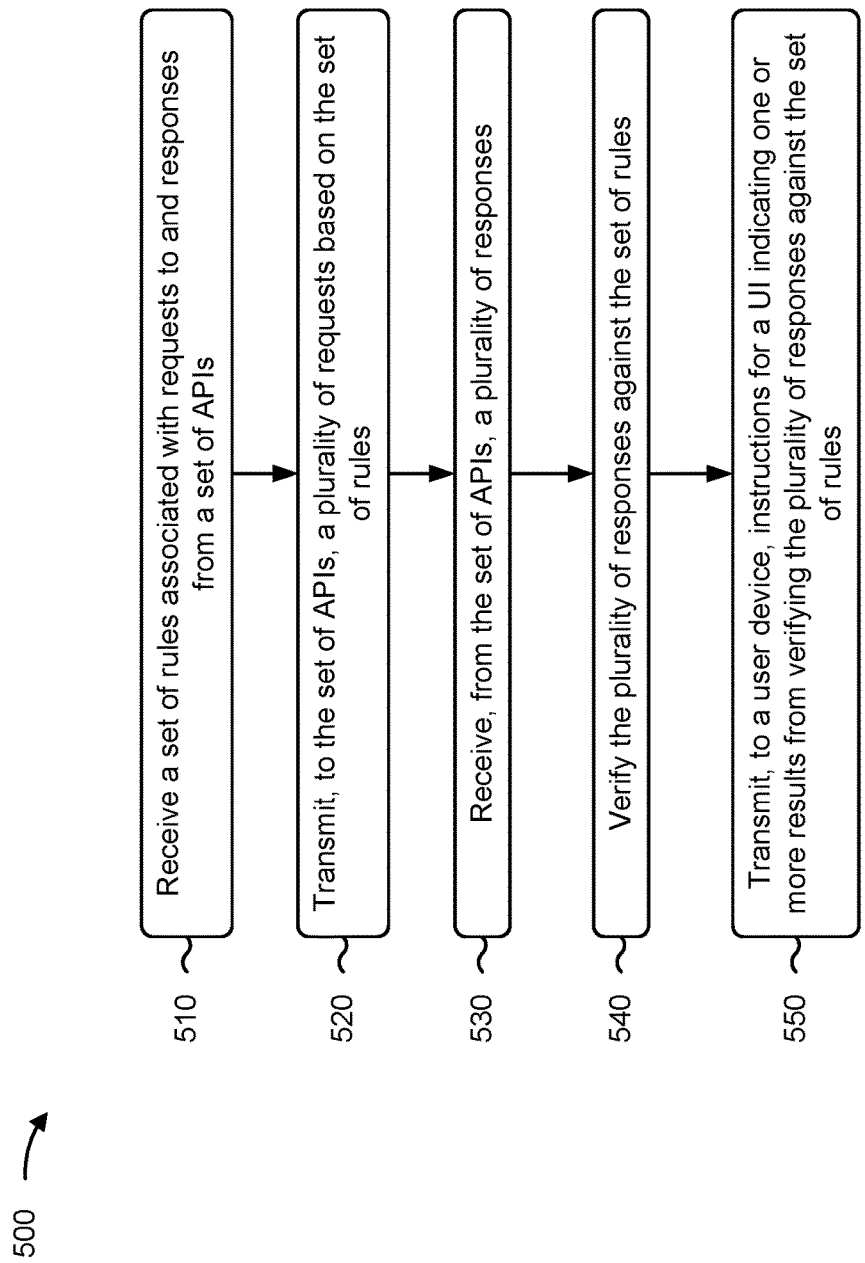
FIG. 5 is a flowchart of an example process relating to validation of a set of APIs.

FIG. 5 is a flowchart of an example process 500 associated with validation of a set of APIs. In some implementations, one or more process blocks of FIG. 5 may be performed by the validation device 301. In some implementations, one or more process blocks of FIG. 5 may be performed by another device or a group of devices separate from or including the validation device 301, such as a device implementing a rules database 330, a data provider 340, a device providing an authorization API 350, a device providing a set of APIs 360, and/or an aggregator 370. Additionally, or alternatively, one or more process blocks of FIG. 5 may be performed by one or more components of the device 400, such as processor 420, memory 430, input component 440, output component 450, and/or communication component 460.

As shown in FIG. 5, process 500 may include receiving a set of rules associated with requests to and responses from the set of APIs (block 510). For example, the validation device 301 (e.g., using processor 420, memory 430, input component 440, and/or communication component 460) may receive a set of rules associated with requests to and responses from the set of APIs, as described above in connection with reference number 105 of FIG. 1A.

As further shown in FIG. 5, process 500 may include transmitting, to the set of APIs, a plurality of requests based on the set of rules (block 520). For example, the validation device 301 (e.g., using processor 420, memory 430, and/or communication component 460) may transmit, to the set of APIs, a plurality of requests based on the set of rules, as described above in connection with reference number 125 of FIG. 1C.

As further shown in FIG. 5, process 500 may include receiving, from the set of APIs, a plurality of responses corresponding to the plurality of requests (block 530). For example, the validation device 301 (e.g., using processor 420, memory 430, input component 440, and/or communication component 460) may receive, from the set of APIs, a plurality of responses corresponding to the plurality of requests, as described above in connection with reference number 130 of FIG. 1C.

As further shown in FIG. 5, process 500 may include verifying the plurality of responses against the set of rules (block 540). For example, the validation device 301 (e.g., using processor 420 and/or memory 430) may verify the plurality of responses against the set of rules, as described above in connection with reference number 135 of FIG. 1C and/or reference number 155 of FIG. 1D.

As further shown in FIG. 5, process 500 may include transmitting, to a user device, instructions for a UI indicating one or more results from verifying the plurality of responses against the set of rules (block 550). For example, the validation device 301 (e.g., using processor 420, memory 430, and/or communication component 460) may transmit, to a user device, instructions for a UI indicating one or more results from verifying the plurality of responses against the set of rules, as described above in connection with reference number 140 of FIG. 1D.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel. The process 500 is an example of one process that may be performed by one or more devices described herein. These one or more devices may perform one or more other processes based on operations described herein, such as the operations described in connection with FIGS. 1A-1E and/or FIGS. 2A-2E.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for validating a set of application programming interfaces (APIs), the system comprising:
   one or more memories; and
   one or more processors, communicatively coupled to the one or more memories, configured to:
      receive a subset of rules, associated with requests to and responses from the set of APIs, from a set of rules included in a specification or standards document;
      transmit, to at least one authorization API associated with the set of APIs, a request for an access token;
      receive, from the at least one authorization API, the access token in response to the request,
         wherein the access token is used to transmit a plurality of test requests;
      transmit, to the set of APIs, the plurality of test requests using the access token,
         wherein the plurality of test requests are generated based on the subset of rules;
      receive, from the set of APIs, a plurality of test responses corresponding to the plurality of test requests;
      verify the plurality of test responses against the subset of rules;
      output instructions for a user interface (UI) indicating one or more results from verifying the plurality of test responses against the subset of rules;
      receive an indication that one or more production requests were transmitted to the set of APIs;
      receive one or more production responses that were received from the set of APIs;
      verify the one or more production responses against the subset of rules; and
      output instructions to update the UI based on one or more results from verifying the one or more production responses against the subset of rules.

2. The system of claim 1, wherein the one or more processors are configured to:
   receive, from an administrator device associated with the set of APIs, the access token.

3. The system of claim 1, wherein the one or more processors are configured to:
   verify that the access token is accepted by the set of APIs,
      wherein the UI further indicates a result from verifying that the access token is accepted.

4. The system of claim 1, wherein the one or more processors, to verify the plurality of test responses, are configured to:
   verify that at least one field, indicated in the subset of rules, is present in at least one of the plurality of test responses; and
   verify that at least one value, included in at least one of the plurality of test responses, is in a format indicated in the subset of rules.

5. The system of claim 1, wherein the plurality of test requests are associated with a first account, and wherein the one or more processors are configured to:
   receive an indication of a second account;
   transmit an additional plurality of test requests associated with the second account and generated based on the subset of rules;
   receive, from the set of APIs, an additional plurality of test responses;
   verify the additional plurality of test responses against the subset of rules; and
   output instructions to update the UI based on one or more results from verifying the additional plurality of test responses against the subset of rules.

6. The system of claim 1, wherein the one or more processors are configured to:
   generate one or more data examples by applying one or more transformations to the plurality of test responses or to the one or more production responses,
      wherein the UI includes the one or more data examples.

7. A method of validating a set of application programming interfaces (APIs), comprising:
   receiving a set of rules associated with requests to and responses from the set of APIs;
   transmitting, to at least one authorization API associated with the set of APIs, a request for an access token;
   receiving, from the at least one authorization API, the access token in response to the request,
      wherein the access token is used to transmit a plurality of requests;
   transmitting, to the set of APIs, the plurality of requests using the access token,
      wherein the plurality of requests are based on the set of rules;
   receiving, from the set of APIs, a plurality of responses corresponding to the plurality of requests;
   verifying, at a validation device, the plurality of responses against the set of rules; and
   transmitting, to a user device, instructions for a user interface (UI) indicating one or more results from verifying the plurality of responses against the set of rules.

8. The method of claim 7, wherein the UI includes a visual indicator, associated with an API in the set of APIs, of whether the API passed or failed.

9. The method of claim 8, further comprising:
   receiving, from the user device, an indication of an interaction with the visual indicator; and
   outputting instructions for an additional UI including information about the API associated with the visual indicator.

10. The method of claim 7, wherein an API in the set of APIs is associated with a plurality of failures, and the UI includes a plurality of indicators corresponding to the plurality of failures.

11. The method of claim 7, further comprising:
    generating, at the validation device, one or more data examples by applying one or more transformations to the plurality of responses,
       wherein the UI includes the one or more data examples.

12. The method of claim 7, wherein verifying the plurality of responses against the set of rules comprises:
verifying, at the validation device, that at least one field, indicated in the set of rules, is present in at least one of the plurality of responses; and
verifying, at the validation device, that at least one value, included in at least one of the plurality of responses, is in a format indicated in the set of rules.

13. The method of claim 7, further comprising:
receiving, at the validation device, an indication of an interaction with the UI; and
outputting instructions for an overlay window including a most recent response of the plurality of responses.

14. The method of claim 7, further comprising:
receiving an indication that one or more production requests were transmitted to the set of APIs;
receiving one or more production responses that were received from the set of APIs;
verifying the one or more production responses against the set of rules; and
transmitting instructions to update the UI based on one or more results from verifying the one or more production responses against the set of rules.

15. A non-transitory computer-readable medium storing a set of instructions for validating a set of application programming interfaces (APIs), the set of instructions comprising:
one or more instructions that, when executed by one or more processors of a device, cause the device to:
receive a subset of rules, associated with requests to and responses from the set of APIs, from a set of rules included in a specification or standards document;
transmit, to at least one authorization API associated with the set of APIs, a request for an access token;
receive, from the at least one authorization API, the access token in response to the request,
wherein the access token is used to transmit a plurality of test requests;
transmit, to the set of APIs, the plurality of test requests using the access token,
wherein the plurality of test requests are generated based on the subset of rules;
receive, from the set of APIs, a plurality of test responses corresponding to the plurality of test requests;
verify the plurality of test responses against the subset of rules;
receive an indication that one or more production requests were transmitted to the set of APIs;
receive one or more production responses that were received from the set of APIs;
verify the one or more production responses against the subset of rules; and
output an indication of results from verifying the one or more production responses against the subset of rules and verifying the plurality of test responses against the subset of rules.

16. The non-transitory computer-readable medium of claim 15, wherein the one or more instructions, when executed by the one or more processors, further cause the device to:
generate one or more data examples by applying one or more transformations to the plurality of test responses or to the one or more production responses; and
output an indication of the one or more data examples.

17. The non-transitory computer-readable medium of claim 15, wherein the one or more instructions, that cause the device to verify the one or more production responses against the subset of rules, cause the device to:
verify that at least one field, indicated in the subset of rules, is present in a portion of the one or more production responses; and
verify that at least one value, included in a portion of the one or more production responses, is in a format indicated in the subset of rules.

18. The non-transitory computer-readable medium of claim 15, wherein the one or more instructions, that cause the device to receive the indication that the one or more production requests were transmitted, cause the device to:
receive, from an aggregator, a copy of the one or more production requests.

19. The non-transitory computer-readable medium of claim 18, wherein the one or more instructions, that cause the device to receive the one or more production responses, cause the device to:
transmit, to the aggregator, a request for responses based on receiving the copy of the one or more production requests; and
receive, from the aggregator, a copy of the one or more production responses in response to the request for responses.

20. The non-transitory computer-readable medium of claim 15, wherein the specification or standards document is associated with a financial data exchange.

* * * * *